United States Patent [19]
Long et al.

[11] Patent Number: 5,692,986
[45] Date of Patent: Dec. 2, 1997

[54] VARIABLE DWELL CYCLOIDAL INDEXING DEVICE

[75] Inventors: Michael Long, Rochester; James A. White, Conesus, both of N.Y.

[73] Assignee: Eastman Kodak Company, Rochester, N.Y.

[21] Appl. No.: 572,374

[22] Filed: Dec. 14, 1995

[51] Int. Cl.$^6$ .................... F16H 35/02; F16H 37/12
[52] U.S. Cl. .................. 475/14; 74/52; 74/393; 83/152; 83/628; 475/162
[58] Field of Search .......... 475/14, 162; 74/52, 74/116, 393; 83/100, 152, 628, 685; 198/343.1, 343.2, 471.1, 689.1

[56] References Cited

U.S. PATENT DOCUMENTS

| | | | |
|---|---|---|---|
| 174,918 | 1/1876 | Loomis | 475/14 |
| 377,133 | 1/1888 | Arnold. | |
| 907,690 | 12/1908 | Harbeck | 83/100 |
| 2,152,288 | 5/1939 | Seybold. | |
| 2,535,774 | 12/1950 | Armelin | 475/14 |
| 3,516,267 | 6/1970 | Uhlir | 475/14 |
| 3,608,391 | 9/1971 | Bargstedt | 475/14 |
| 4,018,090 | 4/1977 | Brems | 74/52 |
| 4,257,295 | 3/1981 | Patel | 83/628 X |
| 5,235,884 | 8/1993 | Magnuson | 83/100 |

FOREIGN PATENT DOCUMENTS

| | | |
|---|---|---|
| 1129029 | 6/1955 | Germany. |
| 1084541 | 6/1960 | Germany. |
| 60-104632 (A) | 6/1985 | Japan. |

OTHER PUBLICATIONS

John H. Bickford, *Mechanisms for Intermittent Motion*, pp. 139–145 and 149–150.

*Primary Examiner*—Charles A. Marmor
*Assistant Examiner*—Troy Grabow
*Attorney, Agent, or Firm*—Mark G. Bocchetti

[57] ABSTRACT

A variable dwell cycloidal indexing device for converting a uniform rotational motion into intermittent rotational motion with greater than one predetermined dwell point. The device includes an input shaft having an axis of rotation with a stub shaft extending eccentrically from a distal end of the input shaft. A planetary gear is rotatably mounted on the stub shaft. There is an internal gear rotatably supported on the input shaft and mounted coaxially therewith with the planetary gear intermeshing with said internal gear. A crank pin projects from the planetary gear at a position eccentric to the axis of rotation of the planetary gear. The motion of the crank pin during rotation of the input shaft is defined by allowing the crank pin to oscillate in a slide slot at a fixed location, or by attaching the crank pin to a pivoting link which is, in turn, attached to a fixed point. In either case, rotation of the planetary gear about its own axis is limited. The number of dwell points is determined by the gear ratio between the internal gear and the planetary gear.

18 Claims, 8 Drawing Sheets

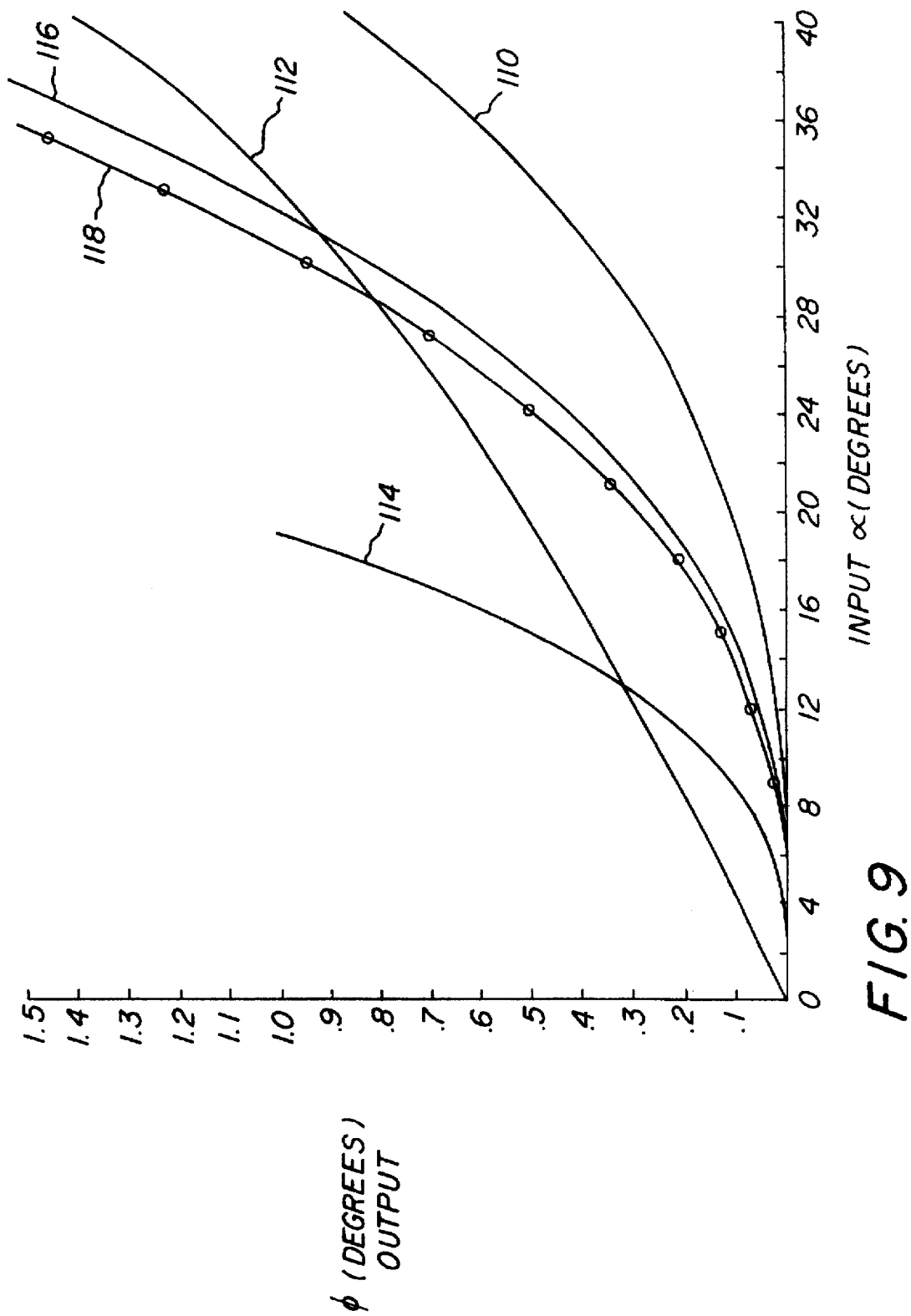

VARIABLE DWELL CYCLOIDAL INDEXING DEVICE

BACKGROUND OF THE INVENTION

1. Field of the Invention

The present invention relates generally to gear systems which provide intermittent motion and, more particularly, to planetary gear indexing devices for converting a uniform rotational motion to a variable rotational motion having greater than one dwell point.

2. Brief Description of the Prior Art

A number of stepping gear devices are known in the prior art which produce a varying output motion having one or more periods per cycle of near zero displacement when driven from a single input source having a constant angular velocity. The shortcomings of these devices generally lies in their complexity and number of components and in their ability to provide an extended period of little or no output motion. One such device is taught in U.S. Pat. No. 2,535,774 to Armelin. Armelin teaches a device which employs a cain, multiple pinion gears, a planetary gear, two slides, a cam follower affixed to the end of a sliding rod and a large toothed disk. The Armelin device can produce one stop per input cycle at high speeds but operates at a near lock-up condition when configured to achieve multiple stops per input cycle. Thus, with multiple stops per input cycle, excessive loading is produced which prohibits use of the Armelin device at high speeds.

U.S. Pat. No. 3,608,391 to Bargsted teaches a stepping gear having a driving and a driven shaft with the gear means there between. At least one of the shafts is located in stationary bearings and one of the shafts is connected to a crank wherein during rotation of the driving shaft a part of the gear means is adapted to reciprocate, pivot or rotate in dependence upon the crank about the axle of another interconnected gear. This results in the rotation of the driven shaft being accelerated, decelerated or reversed thereby.

U.S. Pat. No. 377,133 to Arnold teaches yet another apparatus for converting uniform rotational motion into irregular rotational motion. The Arnold device employs a worm, multiple gears, multiple arms, studs and links in order to achieve this irregular rotational motion while producing a significant dwell error.

There are many indexing applications where stepping gear devices are needed to produce intermittent rotational movement. It is often desirable to achieve a truly zero motion dwell period or, to at least approach a zero motion dwell period as closely as possible without resorting to the introduction of lost motion to the drive by increasing gear backlash. One such application is in a device for the acquisition of product punched out of a web with the punch and die of a double eccentric punch press thereby allowing the transfer of that product to a stationary accumulator. The acquisition of product from a double eccentric punch press is much more difficult than is the case with a stationary punch press since the punch and the die blocks move in generally circular paths. This need has been satisfied in the past by allowing the product to drop free of the circular path of the die block by gravity and, sometimes assisted by air jets to a funnel shaped chute or, directly onto a conveyor belt. Unfortunately, the precise position and orientation of the product which was established when it was punched from the carrier web is lost in such methods which results in complicating subsequent operations. In addition, at high production rates, there is a likelihood of jams in the chute receiving the product punched. Solutions to these problems which are technically possible involve the use of four bar linkages or hypocycloidal pick and place devices which utilize a vacuum platen to acquire the product directly from the moving die block by matching the motion of the press over a short segment of its travel immediately after punching. The product is then transferred to a subsequent operation without losing the product position or orientation. While these devices represent a much surer means of transferring the product to a subsequent operation, they are relatively complex and require a great deal of engineering computation to design them to precisely match the motion of the press and to transfer the product as desired.

SUMMARY OF THE INVENTION

It is therefore an object of the present invention to provide a device for converting uniform rotational motion into the intermittent rotational motion with greater than one dwell point.

It is a further object of the present invention to provide a parts acquisition indexing device for use with a double eccentric punch press.

It is a further object of the present invention to provide a parts acquisition indexing device which does not rely on gravity.

Mother object of the present invention is to provide a parts acquisition indexing device which does not lose part position registration or orientation.

Still another object of the present invention is to provide a stepping gear device in which dwell error is minimized.

These and numerous other objects, features and advantages of the present invention will be readily apparent upon a review of the detailed description, claims and drawings set forth hereinafter. These objects, features and advantages are accomplished through the use of a planetary gear mounted eccentrically off of a input shaft such that the planetary gears axis moves in an orbital path with the planetary gear prevented from rotating freely about its own axis. The planetary gear engages an internal gear with the rotational axis of the internal gear being coincident with the center of the orbital path of the planetary gear.

When the present invention is used for parts acquisition from a double eccentric punch press. The input shaft is attached to and concentric with the eccentric stub shaft of the double eccentric punch press. The internal gear is mounted to a vacuum drum which turns in bearings concentric with the input shaft.

A torque arm is provided which prevents the planetary gear from turning freely about its own axis. The means of constraining the rotation of the planetary gear about its own axis determines the amplitude of the velocity fluctuation and the dwell time of the output. For example, if the planetary is absolutely prevented from rotating about its own axis by use of a torque arm of infinite length having one end slidably mounted in a slot, then the output velocity will be constant for a constant velocity input. If the rotation of the planetary gear about its own axis is constrained to follow a cyclical profile through the use of, for example, a finite length torque arm attached rigidly to the planetary gear on one end with the other end constrained to oscillate in a straight path, an arcuate path or other path, then a cyclical velocity variation is introduced to the output motion. As the torque arm becomes shorter, its angular displacement increases the cyclical speed variation of the output motion until, at some point, an indexing motion is established with zero velocity dwell periods. If the torque arm length is reduced to zero thereby becoming a pin located on the pitch circle of the planetary gear with the pin engaging a slide slot in a fixed frame member, then the output drum remains nearly stationary over a large portion of the input shaft rotation and then very rapidly indexes to its next position. If the pin is inside the pitch circle of the planetary gear, the drum can be made to reverse direction for a short period during the dwell period. The tooth ratio between the internal gear and the planetary gear determines the output gear ratio or number of index stops. If the internal gear is attached to the output device and if $N_1$ and $N_2$ represent the number of teeth on the planetary gear and the internal gear, respectively, then the speed ratio of the output to input is given by the formula $(N_2-N_1)/N_2$. If the internal gear is held stationary and the output device is attached to the planetary gear then the input to output ratio is given by the formula $(N_1-N_2)/N_1$.

When using the indexing device of the present invention in conjunction with a vacuum drum in order to acquire parts from, for example, an eccentric punch press, it is usually most convenient to transfer the part from the vacuum drum to a stationary device at the apogee of its orbit since, at that point, the part and the drum share the same orbit radius and a stationary finger or fingers may be used to separate the part from the vacuum platen. At any other point, articulated fingers would be required to avoid interfering with the vacuum drum.

BRIEF DESCRIPTION OF THE DRAWINGS

FIG. 9 is a graph plotting input in degrees versus output in degrees over a 40° input (one half of the dwell region motion curve) comparing the indexing device of the present invention versus various other prior art indexing devices having three stop indexes and one prior art device having a one stop index.

DESCRIPTION OF THE PREFERRED EMBODIMENT

Figure 1:
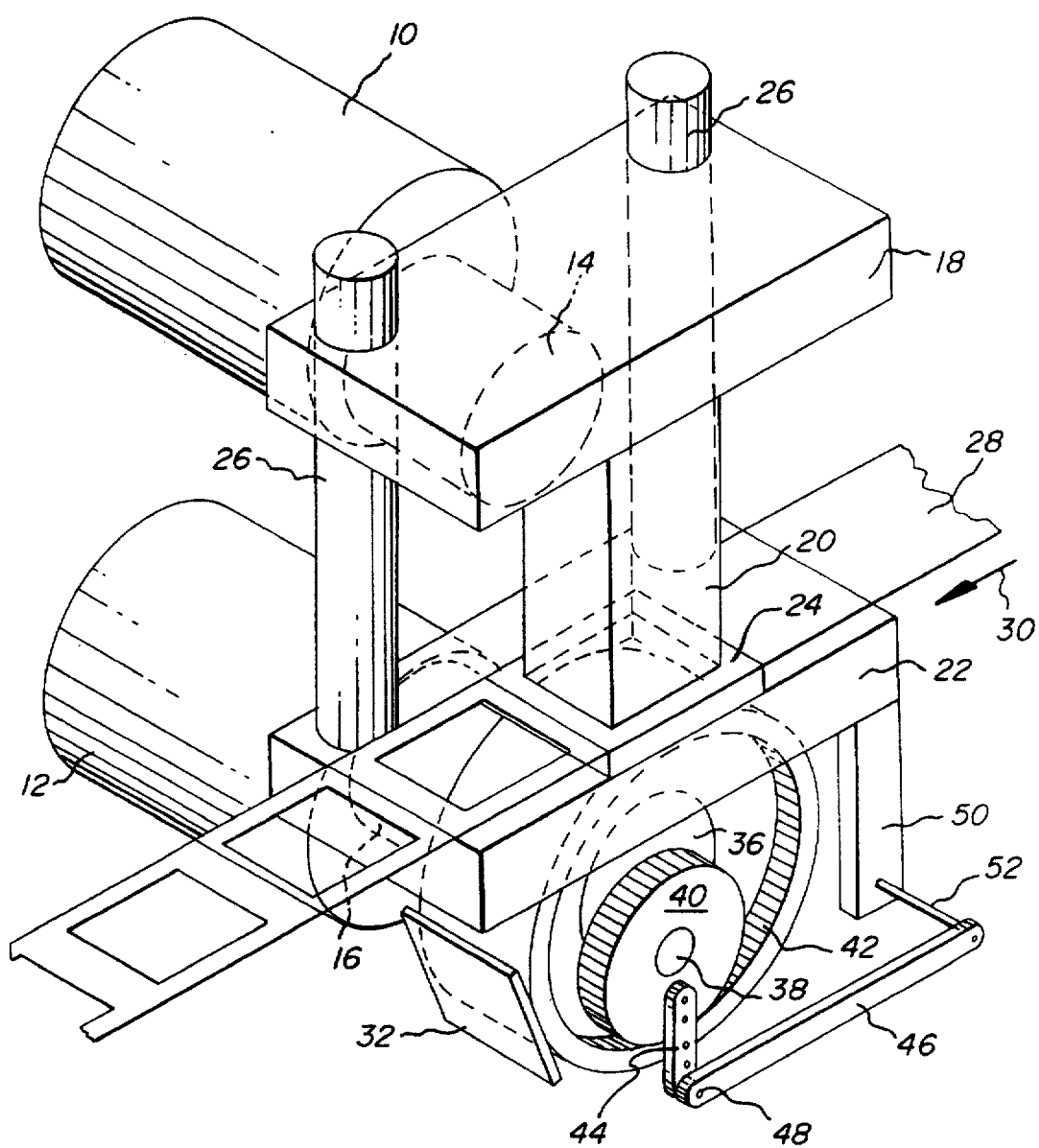
FIG. 1 is a perspective view of the indexing device of the present invention as used in conjunction with an eccentric punch press to acquire product punched from a web.

Turning first to FIG. 1 there is shown an eccentric punch press which includes an upper press shaft 10 and a lower press shaft 12. One of upper and lower press shafts 10, 12 is connected to a motor with the other being geared thereto (not shown) to drive the rotational movement of upper and lower press shafts 10, 12. Extending from upper press shaft 10 is upper drive shaft 14 which is mounted eccentrically to upper press shaft 10 such that their respective cylindrical axes are parallel but not colinear. Extending from lower press shaft 12 is lower drive shaft 16. Lower drive shaft 16 is mounted eccentrically to lower press shaft 12 such that the cylindrical axis of lower drive shaft 16 is parallel to but not colinear with the cylindrical axis of lower press shaft 12.

Connected to upper drive shaft 14 is punch holder 18 from which punch 20 extends. Connected to lower drive shaft 16 is die holder 22 having die 24 mounted to the upper surface thereof. Die posts 26 project from die holder 22 up through orifices in punch holder 18 such that die posts 26 slidably engage punch holder 18 to thereby keep punch 20 in alignment with die 24 during operation of the punch press. A product web 28 is delivered to the punch press in the direction of arrow 30 such that individual parts or products 32 are punched from product web 28. The individual parts or products 32 are taken onto the surface of a vacuum drum 34 which serves as a transfer device from the double eccentric press assembly to a stationary device (not shown in FIG. 1).

In the operation of the double eccentric press, looking at any point on the punch holder 18 or the die holder 22, that point would follow a circular path such that as the punch occurs with the punch 20 moving into die 24, the punch 20 and die 24 are also moving at a tangential velocity substantially duplicating the linear velocity of the product web 28 through the punch press assembly. It is desirable to receive the individual product 32 punched from the product web 28 onto a surface which is not moving relative to the product web 28 at the point in time that the individual product 32 is received. Thus, the vacuum drum 34 should be driven with an indexing device which provides a stop or dwell which causes the rotation of the vacuum drum 34 to pause for the receipt of the individual product 32 as it is punched from the product web 28. The indexing device of the present invention includes an input shaft 36 which is attached to and concentric with lower drive shaft 16. Extending from input shaft 36 is stub shaft 38. Stub shaft 38 is mounted eccentrically to input shaft 36 such that their respective cylindrical axes are parallel but not colinear. A planetary gear 40 is mounted on stub shaft 38 such that it would be able to rotate freely about stub shaft 38 if not for other elements to be described hereinafter. Planetary gear 40 engages an internal gear or ring gear 42 which rotates about input shaft 36. Internal gear 42 is mounted to and is concentric with vacuum drum 34 thereby driving the rotation of the vacuum drum 34.

A torque arm 44 is rigidly attached on one end to planetary gear 40. Torque arm 44 is connected to a pivoting link or crank throw 46 by means of a crank pin 48. Pivoting link 46 is, in turn, pivotally connected to frame member 50 by means of pin or crank shaft 52. The pinned connection of pivoting link 46 to torque arm 44 with the pivoting link 46 ultimately being connected to the frame member 50 serves as a means of constraining the rotation of planetary gear 40 about stub shaft 38 and, thus, defines the path along which the crank pin 48 oscillates during rotation of the input shaft 36. This determines the amplitude of the velocity fluctuation and dwell time of the vacuum drum 34.

Figure 2:
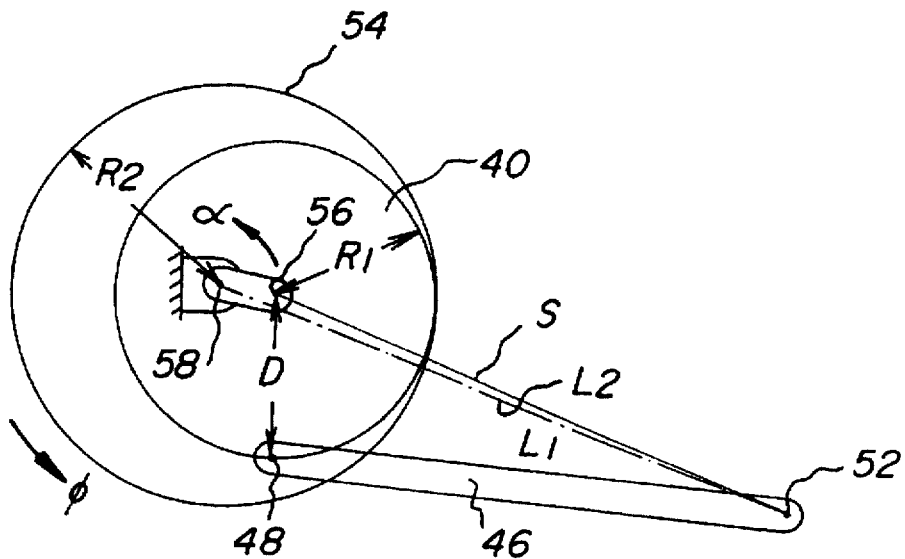
FIG. 2 is a side view schematic representation of the indexing device of the present invention.

Looking next at FIG. 2 there is shown a side view schematic representation of the indexing device of the present invention. The planetary gear 40 orbits within a circle 54 representing internal or ring gear 42. The planetary gear 40 has an axis of rotation 56 while revolving about the center point 58 of circle 54. The pivoting link 46 is connected by crank pin 48 to the planetary gear 40, in this instance on the pitch circle of the planetary gear 40, with the pivoting link 46 having a length of $L_1$. The radius of the planetary gear 40 is $R_1$ and the radius of circle 54 is $R_2$. The distance between crank pin 48 and the axis of rotation 56 of planetary gear 40 is represented as D. The distance between the center point 58 and the point at which pivoting link 46 is attached to the frame is represented as $L_2$. If the input rotation is represented as $\alpha$, and the output rotation is represented as $\phi$, then the output rotation of the internal or ring gear 42 and, of course, the vacuum drum 34 to which it is attached becomes:

$$\phi = \alpha - \frac{R_1}{R_2}\left[\alpha + \cos^{-1}\left(\frac{D^2 + S^2 + L_1^2}{2DS}\right) + \sin^{-1}\left(\frac{(R_2 - R_1)\sin\alpha}{S}\right)\right]$$

where S is the distance from the center of planetary gear 40 to pin 52 and can be solved for in the equation $$S = \sqrt{L_2^2 + (R_2 - R_1)^2 - 2L_2(R_2 - R_1)\cos\alpha}$$

Figure 3:
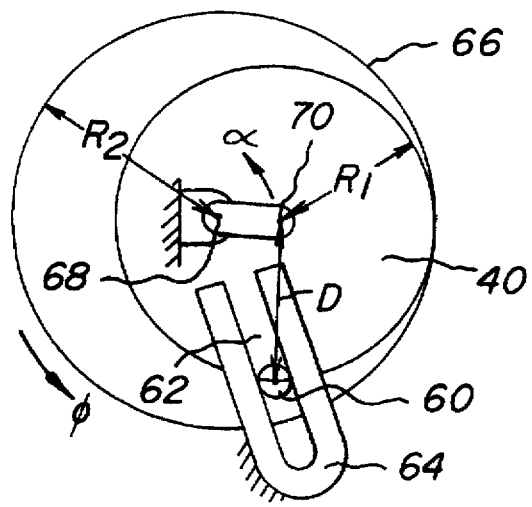
FIG. 3 is a side view schematic of an alternative embodiment of the indexing device of the present invention.

Looking next at FIG. 3, there is shown a side view schematic representation of an alternative embodiment of the indexing device of the present invention depicted in FIGS. 1 and 2. In the alternative embodiment, there is a pin 60 which projects from the planetary gear 40 at a point on the pitch circle of the planetary gear 40. That pin 60 projects into a slot 62 in slide member 64, slide member 64 is fixed to a frame. The positioning of pin 60 in slot 62 limits the amount of rotational freedom of planetary gear 40 as planetary gear 40 orbits within circle 66, which represents the internal gear mounted on the vacuum drum. Slot 62 may be straight or arcuate and, of course, define the path that pin 60 will oscillate in as planetary gear 40 orbits within internal gear 66. Again, $R_1$ represents the radius of the planetary gear 40 and $R_2$ represents the radius of circle 66 with planetary gear 40 orbiting the center point 68 of circle 66. D represents the distance between pin 60 and center point 70 of planetary gear 40. The rotational output $\phi$ in degrees of this alternative embodiment of the device can then be represented by the equation:

$$\phi = \alpha - \frac{R_1}{R_2}\left[\alpha + \sin^{-1}\frac{(R_2 - R_1)\sin\alpha}{D}\right]$$

with $\alpha$ representing the rotational input in degrees.

Figure 4:
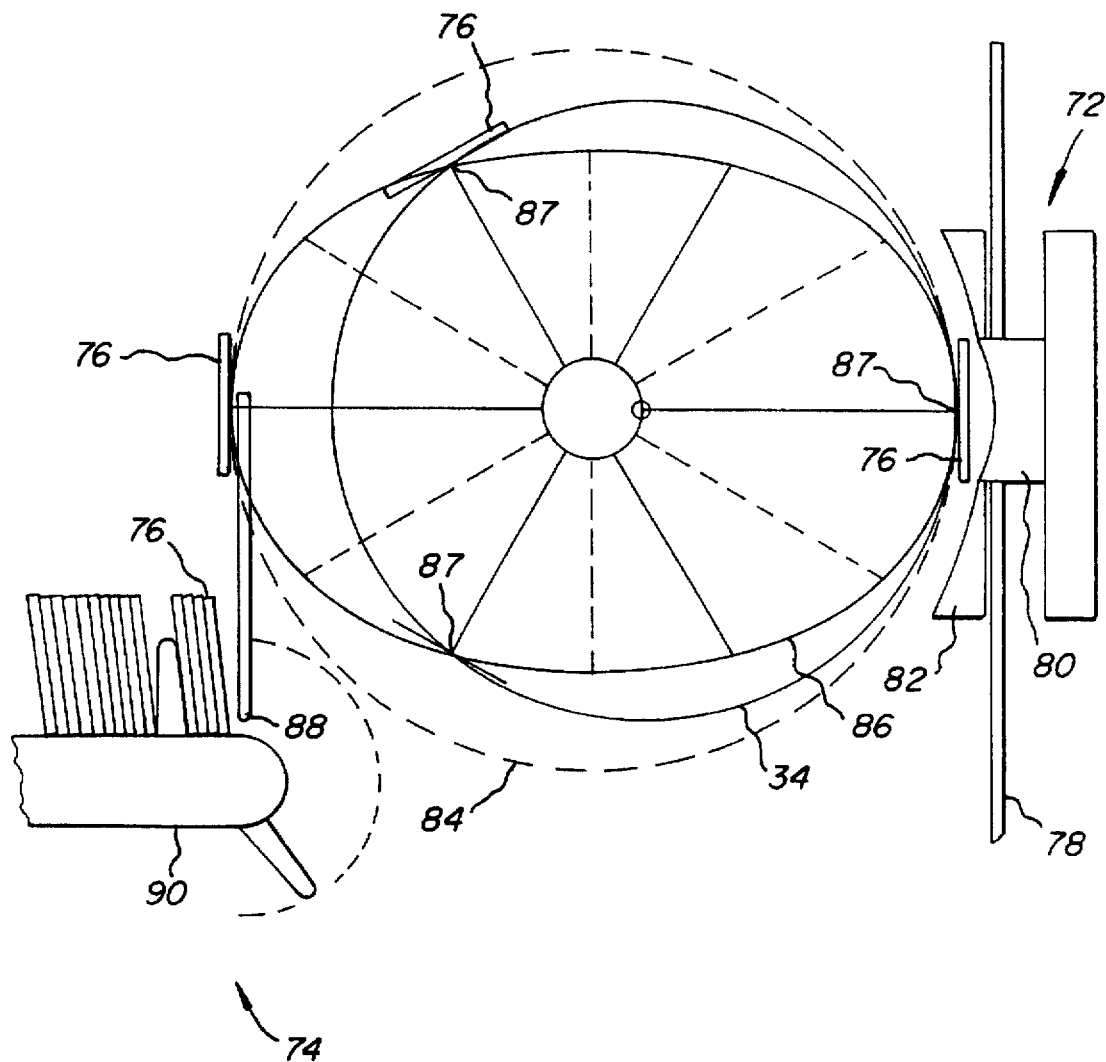
FIG. 4 is a side view schematic showing the part trajectory, dwell points, and vacuum drum orbit for the indexing device of the present invention having a gear ratio of 3:1.

There is shown in FIG. 4 a schematic of the movements of the indexing device of the present invention in combination with a double eccentric punch press 72 and a conveyor system 74 for receiving individual product 76 punched from web 78. The schematic of FIG. 4 represents the movements of an indexing device of the present invention having a gear ratio of 3:1. Individual product 76 is punched by means of the punch block 80 entering die 82 with the individual product 76 being delivered to the surface of the vacuum drum 34. Recalling from FIG. 1 that vacuum drum 34 is mounted on an input shaft 36 which is concentric with the lower drive shaft 16 which is, in turn, eccentrically mounted on the lower press shaft 12, the vacuum drum both rotates and moves in an orbital path. Dashed line 84 represents the outside orbit of vacuum drum 34. The individual product 76 taken onto the surface of the vacuum drum 34 follow an oval path 86 with this 3:1 gear ratio. If the gear ratio is modified to be a 4:1 ratio, the path or trajectory of the individual product 76 becomes generally triangular. The dwell points 87 of the indexing device of the present invention become those points where the circumference or periphery of the vacuum drum 34 intersect the path 86 of the individual product 76. Thus, there are three dwell points 87 one of which being immediately adjacent the punch block 80 ensuring that the rotation of vacuum drum 34 is stopped when receiving the individual product 76. Regardless of the path 86 followed by the individual product 76 it is usually most convenient to transfer the individual product 76 to a stationary device, in this case 74, at the apogee of the orbit of the stationary product since at that point, the individual product 76 and the vacuum drum 34 share the same orbit radius. A stationary finger or fingers 88 may be used to separate the individual product 76 from the surface of the vacuum drum. To attempt transfer at any other point would require articulated fingers to avoid interfering with the vacuum drum 34. The individual product 76 removed from the surface of vacuum drum 34 by means of finger 88 is thus, oriented correctly onto the conveyor belt 90 and thus, maintained in a stack thereon in the proper orientation.

Figure 5:
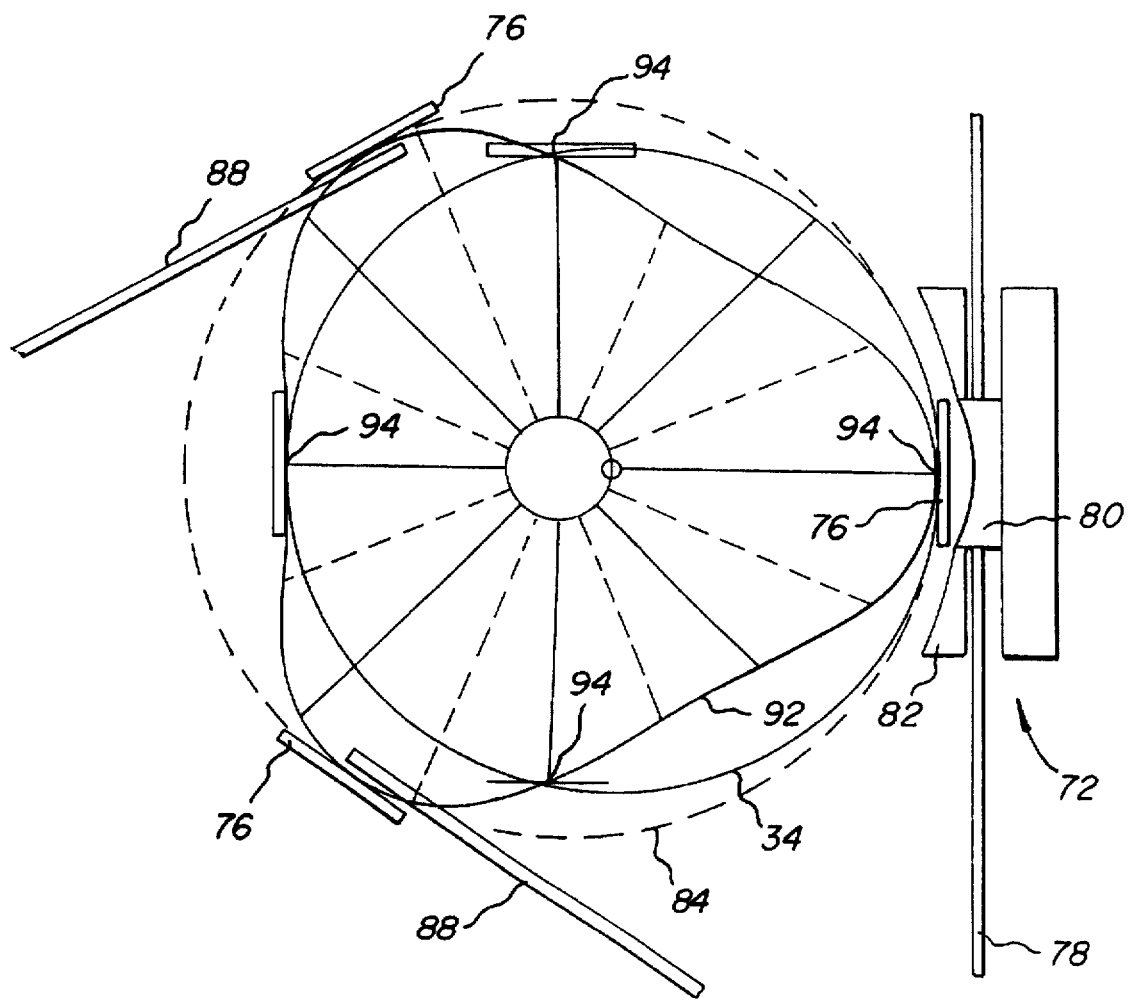
FIG. 5 is a side view schematic showing the part trajectory, dwell points, and vacuum drum orbit for the indexing device of the present invention having a gear ratio of 4:1.

Looking next at FIG. 5, there is shown a schematic of the movements of the indexing device of the present invention with a 4:1 gear ratio. Again, there is a punch press assembly 72 through which a web 78 is delivered with individual product 76 being punched from the web 78 by means of a punch block 80 inserting into a die 82. Again, remembering that the vacuum drum 34 rotates on an eccentric, the dashed line 84 represents the outside of the orbit of the vacuum drum 34. The path 92 of the individual product 76 becomes generally triangular with rounded apexes for a 4:1 gear ratio. With a 4:1 gear ratio there are four dwell points 94, those dwell points 94 being the four points of intersection between the circumference of vacuum drum 34 and path 92. Transfer of the individual product 76 from the surface of the vacuum drum 34 would preferably take place at either one of the other two apexes of the generally triangular path 92 furthest from the punch press assembly 72, the third apex being located immediately adjacent the punch block 80. Again, a finger or fingers 88 may be used at either location to remove the individual product 76 from the surface of vacuum drum 34.

Figure 6:
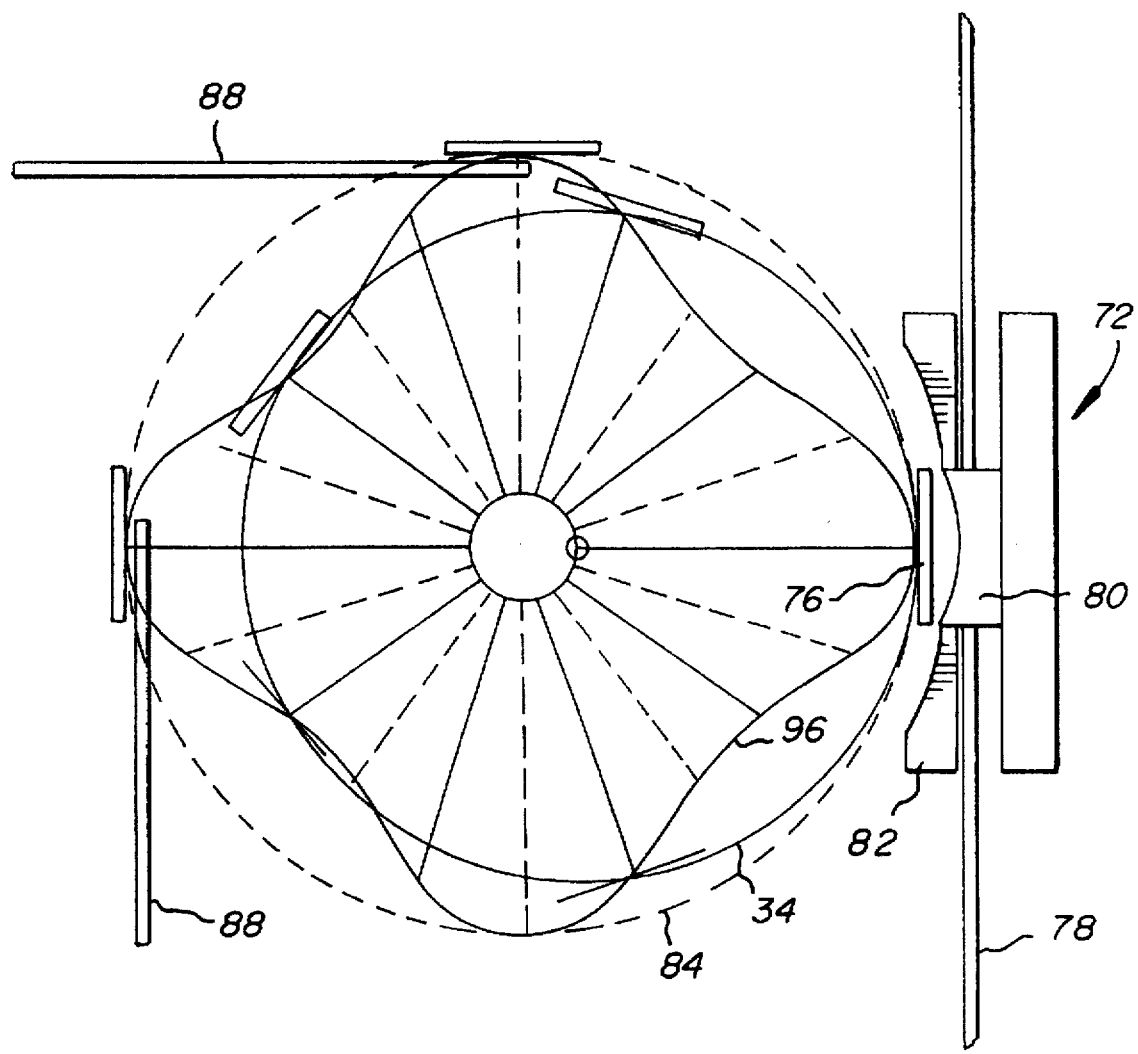
FIG. 6 is a side view schematic showing the part trajectory, dwell points, and vacuum drum orbit for the indexing device of the present invention having a gear ratio of 5:1.

There is shown in FIG. 6 a side view schematic of the movements of the indexing device of the present invention when configured with a 5:1 gear ratio. Again the schematic is shown in conjunction with a punch press assembly 72 through which a web 78 is delivered. Individual product 76 is punched from web 78 by means of a punch block 80 which inserts into a die 82. Again, with the vacuum drum 34 mounted eccentrically, dashed line 84 depicts the outer orbital path of vacuum drum 34. The path 96 of the individual product 76 held to the outside surface of the vacuum drum 34 becomes generally square with rounded corners with one of the corners being located directly adjacent punch block 80. Transfer of the individual product 76 from the surface of the vacuum drum 34 can again be by means of fingers 88 located to intersect path 96 at one of the other corners.

In the operation of the indexing device of the present invention, if the pin 48 is located just slightly inside the pitch circle of the planetary gear 40 the apparent dwell can be appreciably lengthened for a given level of acceptable dwell error by introducing an extremely slight reversing motion to the output (vacuum drum 34). Locating the pin 48 further inside the pitch circle of the planetary gear 40 will cause the vacuum drum 34 to reverse direction for a short period of time. The tooth ratio between the internal gear 42 and the planetary gear 40 determines the output gear ratio or number of index stops. If the internal gear 42 is attached to the vacuum drum 34 as depicted in FIG. 1, and if $N_1$ and $N_2$ represent the number of teeth of the planetary gear 40 and the internal gear 42, respectively, then the speed ratio of the output to input is given by the formula $(N_2-N_1)/N_2$. If the internal gear 42 is held stationary and the output drum 34 is attached to the planetary gear 40, then the input to output ratio is given by the formula $(N_1-N_2)/N_1$. Table 1 below shows the number of index stops achieved for various combinations of gear teeth $N_1$ and $N_2$ (where the speed ratio of the output to input is given by the formula $(N_2-N_1)/N_2$). Note the extremely high gear ratios achievable in a compact space without resorting to compound gear train. Further, this is achieved without incurring the additional backlash inevitable in multiple gear trains. For the application of receiving product from an eccentric punch press and delivering that product to a stationary conveyor, it is preferable to use the indexing device of the present invention with a 3:1 gear ratio. With the 3:1 gear ratio, the vacuum drum 34 indexes one-third of a revolution for each turn of the lower press shaft 12. The 3:1 gear ratio is preferable for two reasons. First, it reduces the nominal velocity of the vacuum drum 34 and second, three indexes per revolution produces a product trajectory or path which is well adapted to feeding a single stationary stacking device. It should be recognized that relative to a stationary observer, the axis of the vacuum drum, being mounted on the punch press jaws follows a circular orbit whereas the punched part on the surface of the vacuum drum 34 will follow various parts depending on the gear ratio. Note the different paths 86, 92, 94 of FIGS. 4, 5 and 6, respectively.

TABLE 1

| Index Stops | $N_1$ Teeth | $N_2$ Teeth |
| --- | --- | --- |
| 2 | 72 | 144 |
| 3 | 96 | 144 |
| 4 | 108 | 144 |
| 5 | 112 | 140 |
| 6 | 120 | 144 |
| 7 | 120 | 140 |
| 8 | 126 | 144 |
| 9 | 128 | 144 |
| 10 | 126 | 140 |
| 11 | 130 | 143 |
| 12 | 132 | 144 |
| 13 | 144 | 156 |
| 14 | 156 | 168 |
| 15 | 168 | 180 |
| 16 | 180 | 192 |
| 20 | 228 | 240 |
| 30 | 348 | 360 |

Figure 7:
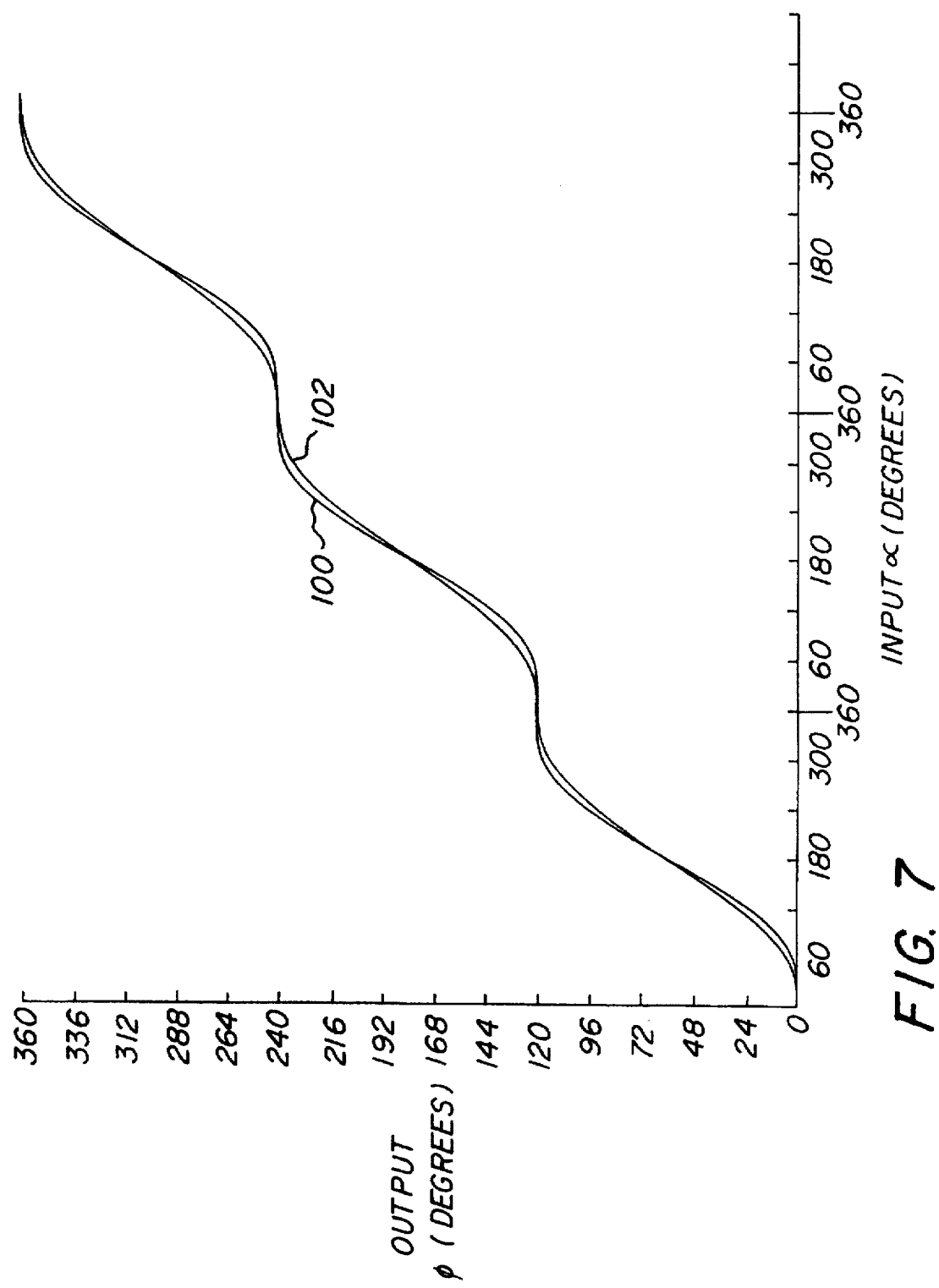
FIG. 7 is a graph plotting the input in degrees versus output in degrees and comparing the indexing device of the present invention with a three stop index versus various prior art devices also having three stop indexes.

FIG. 7 shows the motion curves for the indexing device of the present invention and the device taught in Japanese Patent No. 60-104632 to Kitamura. Curve 100 represents the indexing device of the present invention configured with a 3:1 gear ratio. Curve 102 represents the Kitamura device configured with a three stop index. Note that curve 100 shows a significant prolonging of the dwell period at each dwell point where the output angle φ in degrees remains relatively constant over a longer period of time.

Figure 8:
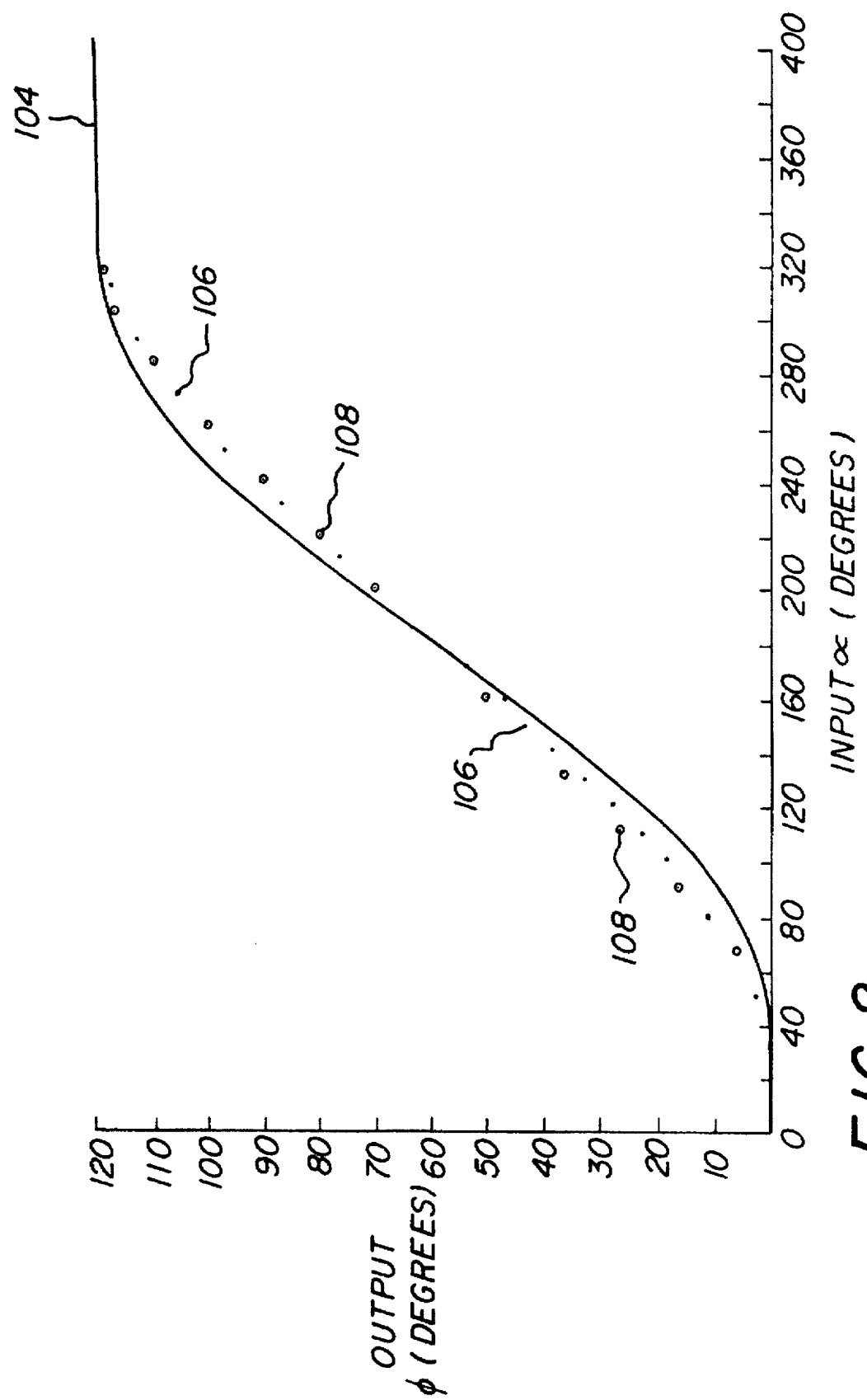
FIG. 8 is a graph plotting input in degrees versus output in degrees over a 360° input comparing the indexing device of the present invention having a three stop index versus two prior art devices also having three stop indexes.

FIG. 8 plots the output motion for the indexing device of the present invention and two prior art devices of 360° of input motion. Curve 104 represents the indexing device of the present invention configured with a 3:1 gear ratio and, therefore, a three stop index. Individual points (.) 106 yield a curve which represents the above discussed Kitamura device configured with a three stop index. Circled points ((○)) 108 yield a curve which represents the output motion for the device taught in U.S. Pat. No. 2,535,774 to Armelin configured with a three stop index. Again, the superiority of the present invention over the prior art devices can be seen from its flatter approach and departure from the dwell points and the steeper rise between dwell points. Again, the output φ remains unchanged at the dwell points for a longer period of time.

There is shown in FIG. 9 half of the dwell region motion curves of four prior art devices as well as the indexing device of the present invention. Curve 110 represents half of the dwell region motion curve for the indexing device of the present invention. Curve 112 represents half of the dwell region motion curve for the Armelin device configured with a three stop index. Curve 114 is half of the dwell region motion curve for the Armelin device configured with a one stop index. Curve 116 represents half of the dwell region motion curve for the Kitamura device configured with a three stop index. Curve 118 represents half of the dwell region motion curve for both of the devices taught in U.S. Pat. Nos. 3,608,391 to Bargsted and 377,133 to Arnold, both configured with a three stop index. Note in comparing curves 112 and 114 that the one stop and three stop motion curves of the Armelin device indicate that such device operates quite differently in producing one stop versus multiple stop indexes. In both cases, however, the Armelin device produces the greatest departure from zero output motion of any of the five devices. Curve 118 shows that both the Arnold and Bargsted devices produce the same output motion and incur a deviation from zero motion which is on the order of 2.8 times greater than the deviation of the indexing device of the present invention for the three stop index shown. The Kitamura device incurs a dwell error which is on the order of 2.5 times greater than the indexing device of the present invention. This is also shown in Table 2 below.

TABLE 2

| Input Angle Degrees | Kitamura Output Angle Degrees | Present Invention Output Angle Degrees |
| --- | --- | --- |
| 0 | 0 | 0 |
| 1.0 | 3.17E-5 | 1.27E-5 |
| 2.0 | 2.54E-4 | 1.02E-4 |
| 3.0 | 8.56E-4 | 3.43E-4 |
| 4.0 | 2.03E-3 | 8.13E-4 |
| 5.0 | 3.96E-3 | 1.59E-3 |
| 6.0 | 6.84E-3 | 2.74E-3 |
| 7.0 | 1.08E-2 | 4.36E-3 |
| 8.0 | 1.62E-2 | 6.51E-3 |
| 9.0 | 2.3E-2 | 9.27E-3 |
| 10.0 | 3.15E-2 | 1.27E-2 |
| 15.0 | 1.05E-1 | |
| 20.0 | 2.47E-1 | 1.02E-1 |

From the foregoing, it will be seen that this invention is one well adapted to attain all of the ends and advantages hereinabove set forth together with other ends and advantages which are apparent and which are inherent to the invention.

It will be understood that certain features and subcombinations are of utility and may be employed with reference to other features and subcombinations. This is contemplated by and is within the scope of the claims.

As many possible embodiments may be made of the present invention without departing from the scope thereof, it is to be understood that all matter herein set forth and shown in the accompanying drawings is to be interpreted as illustrative and not in a limiting sense.

What is claimed is:

1. A device for converting a uniform rotational motion into an algebraically variable rotational motion, said device comprising:
   (a) an input shaft having an axis of rotation;
   (b) a stub shaft extending from a distal end of said input shaft, said stub shaft positioned eccentrically with respect to said axis of rotation of said input shaft;
   (c) a planetary gear rotatably mounted on said stub shaft;
   (d) an internal gear rotatably supported on said input shaft and being coaxial therewith, said planetary gear intermeshing with said internal gear;
   (e) a crank pin affixed to said planetary gear and disposed eccentrically with respect to the axis of rotation of said planetary gear; and
   (f) means attached to a frame for defining a path, said crank pin oscillating in said path as said planetary gear orbits within said internal gear.

2. A device for converting a uniform rotational motion into an algebraically variable rotational motion as recited in claim 1 wherein:
   said means attached to said frame for defining said path is a slide member.

3. A device for converting a uniform rotational motion into an algebraically variable rotational motion as recited in claim 2 wherein:
   said algebraically variable rotational motion is defined by the equation $$\phi = \alpha - \frac{R_1}{R_2}\left[\alpha + \sin^{-1}\frac{(R_2 - R_1)\sin\alpha}{D}\right]$$

where $R_1$ represents the radius of the planetary gear, $R_2$ represents the radius of the internal gear, $D$ represents the distance between the pin and the center point of planetary gear, the input rotation is represented as $\alpha$, and the output rotation is represented as $\phi$.

4. A device for converting a uniform rotational motion into an algebraically variable rotational motion as recited in claim 1 wherein:
   said crank pin projects from said planetary gear from a position on the pitch circle of said planetary gear.

5. A device for converting a uniform rotational motion into an algebraically variable rotational motion as recited in claim 1 wherein:
   said means attached to said frame for defining said path is a crank shaft with a pivoting link secured between said crank shaft and said crank pin.

6. A device for converting a uniform rotational motion into an algebraically variable rotational motion as recited in claim 5 wherein:
   said algebraically variable rotational motion is defined by the equation $$\phi = \alpha - \frac{R_1}{R_2}\left[\alpha + \cos^{-1}\left(\frac{D^2 + S^2 + L_1^2}{2DS}\right) + \sin^{-1}\left(\frac{(R_2 - R_1)\sin\alpha}{S}\right)\right]$$

where $L_1$ is the length of the pivoting link, $R_1$ is the radius of the planetary gear, in this instance on the pitch circle of the planetary gear, $R_2$ is the radius of the internal gear, $D$ is the distance between crank pin and the axis of rotation of planetary gear, $S$ is the distance from the axis of rotation of planetary gear to the point at which crank throw is attached to the frame, the input rotation is represented as alpha, and the output rotation is represented as $\phi$.

7. A dwell indexing device for acquiring parts from a punch press, said device comprising:
   (a) a punch press shaft;
   (b) a drive shaft extending from a distal end of said punch press shaft, said drive shaft mounted eccentrically with respect to said punch press shaft;
   (c) a vacuum drum rotatably mounted on said drive shaft;
   (d) an input shaft mounted coaxially to said drive shaft;
   (e) a stub shaft extending from a distal end of said input shaft, said stub shaft positioned eccentrically with respect to the axis of rotation of said input shaft;
   (f) a planetary gear rotatably mounted on said stub shaft;
   (g) an internal gear affixed to said vacuum drum and being coaxial with said vacuum drum and said input shaft, said planetary gear intermeshing with said internal gear;
   (h) a crank pin affixed to said planetary gear and disposed eccentrically with respect to the axis of rotation of said planetary gear; and
   (i) means attached to a frame for defining a path in which said crank pin oscillates as said planetary gear orbits within said internal gear.

8. A dwell indexing device for acquiring parts from a punch press as recited in claim 7 wherein:
   said crank pin is located on the pitch circle of said planetary gear.

9. A dwell indexing device for acquiring parts from a punch press as recited in claim 7 wherein:
   said crank pin is located proximate to the pitch circle of said planetary gear.

10. A device for converting a uniform rotational motion into intermittent rotational motion with more than one predetermined dwell point, said device comprising:
    (a) an input shaft having an axis of rotation;
    (b) a stub shaft extending from a distal end of said input shaft, said stub shaft positioned eccentrically with respect to said axis of rotation of said input shaft;
    (c) a planetary gear rotatably mounted on said stub shaft;
    (d) an internal gear rotatably supported on said input shaft and being coaxial therewith, said planetary gear intermeshing with said internal gear;
    (e) a crank pin affixed to said planetary gear and disposed eccentrically with respect to the axis of rotation of said planetary gear; and
    (f) a fixed oscillating path, said crank pin moving in said fixed oscillating path as said input shaft rotates.

11. A device for converting a uniform rotational motion into intermittent rotational motion with greater than one predetermined dwell point as recited in claim 10 wherein:
    the number of predetermined dwell points can be varied by changing the gear ratio between the internal gear and the planetary gear.

12. A device for converting a uniform rotational motion into intermittent rotational motion with greater than one predetermined dwell point as recited in claim 10 wherein:
    the gear ratio between the internal gear and the planetary gear is 3:1.

13. A device for converting a uniform rotational motion into intermittent rotational motion with greater than one predetermined dwell point as recited in claim 12 wherein:
    the number of dwell points is given by the gear ratio $$N_2/(N_2 - N_1)$$

where the ring gear size is $N_2$ and the planetary gear size is $N_1$.

14. A device for converting a uniform rotational motion into intermittent rotational motion with greater than one predetermined dwell point as recited in claim 10 wherein:

the gear ratio between the internal gear and the planetary gear is 4:1.

15. A device for converting a uniform rotational motion into intermittent rotational motion with greater than one predetermined dwell point as recited in claim 10 wherein:

the gear ratio between the internal gear and the planetary gear is 5:1.

16. A device for converting a uniform rotational motion into intermittent rotational motion with greater than one predetermined dwell point as recited in claim 10 wherein:

said crank pin is located on the pitch circle of said planetary gear.

17. A device for converting a uniform rotational motion into intermittent rotational motion with greater than one predetermined dwell point as recited in claim 10 wherein:

said crank pin is located proximate to the pitch circle of said planetary gear.

18. A device for converting a uniform rotational motion into intermittent rotational motion with greater than one predetermined dwell point as recited in claim 10 wherein:

the number of dwell points is given by the gear ratio $$N_2/(N_2-N_1)$$

where the ting gear size is $N_2$ and the planetary gear size is $N_1$.

* * * * *